(12) United States Patent
Nishimura

(10) Patent No.: US 11,208,549 B2
(45) Date of Patent: Dec. 28, 2021

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventor: Shota Nishimura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/481,597

(22) PCT Filed: Feb. 5, 2018

(86) PCT No.: PCT/JP2018/003809
§ 371 (c)(1),
(2) Date: Jul. 29, 2019

(87) PCT Pub. No.: WO2018/143455
PCT Pub. Date: Aug. 9, 2018

(65) Prior Publication Data
US 2019/0390049 A1 Dec. 26, 2019

(30) Foreign Application Priority Data
Feb. 6, 2017 (JP) .............................. JP2017-019814

(51) Int. Cl.
| | | |
|---|---|---|
| *C08L 27/06* | (2006.01) | |
| *B32B 27/06* | (2006.01) | |
| *B32B 27/20* | (2006.01) | |
| *B32B 27/22* | (2006.01) | |
| *B32B 27/30* | (2006.01) | |
| *B32B 27/40* | (2006.01) | |
| *C08K 3/04* | (2006.01) | |
| *C08K 3/22* | (2006.01) | |
| *B29L 31/30* | (2006.01) | |

(52) U.S. Cl.
CPC ............ *C08L 27/06* (2013.01); *B32B 27/065* (2013.01); *B32B 27/20* (2013.01); *B32B 27/22* (2013.01); *B32B 27/304* (2013.01); *B32B 27/40* (2013.01); *C08K 3/04* (2013.01); *C08K 3/22* (2013.01); *B29L 2031/3008* (2013.01); *B32B 2250/02* (2013.01); *B32B 2250/24* (2013.01); *B32B 2605/003* (2013.01); *C08K 2003/2251* (2013.01); *C08K 2003/2262* (2013.01); *C08K 2003/2265* (2013.01)

(58) Field of Classification Search
CPC ....... B32B 27/065; B32B 27/22; B32B 27/20; C08K 3/04; C08K 5/0091; C08K 2003/2265; C08K 2003/2251; C08K 2003/2262; C08J 5/00; C08L 27/06
See application file for complete search history.

(56) References Cited

U.S. PATENT DOCUMENTS

| | | | | |
|---|---|---|---|---|
| 4,424,292 A | * | 1/1984 | Ravinovitch | ............ C08K 3/22 524/180 |
| 6,171,383 B1 | * | 1/2001 | Sakoske | ................. C01G 45/00 106/400 |
| 6,221,147 B1 | * | 4/2001 | Sakoske | ................. C01G 45/00 106/400 |
| 2006/0128862 A1 | * | 6/2006 | Kanayama | .............. C08L 25/08 524/407 |
| 2015/0322244 A1 | * | 11/2015 | Iwahori | ................... C08L 63/00 428/319.7 |
| 2016/0347932 A1 | | 12/2016 | Shota | |

FOREIGN PATENT DOCUMENTS

| | | |
|---|---|---|
| CN | 104812833 A | 7/2015 |
| CN | 105916933 A | 8/2016 |
| EP | 0088416 A1 | 9/1983 |
| JP | S58167642 A | 10/1983 |
| JP | 2001311049 A | 11/2001 |
| JP | 2002012679 A | 1/2002 |
| JP | 2004250553 A | 9/2004 |
| JP | 2005206118 A | 8/2005 |
| JP | 2006273985 A * | 10/2006 |
| JP | 2012197394 A | 10/2012 |
| JP | 2016037258 A | 3/2016 |
| WO | 2009037905 A1 | 3/2009 |
| WO | 2014091867 A1 | 6/2014 |
| WO | 2015141182 A1 | 9/2015 |
| WO | 2016098344 A1 | 6/2016 |

OTHER PUBLICATIONS

Translation of JP 2006 273985, Shinohara et al., Oct. 12, 2006. (Year: 2006).*
May 1, 2018, International Search Report issued in the International Patent Application No. PCT/JP2018/003809.
Aug. 6, 2019, International Preliminary Report on Patentability issued in the International Patent Application No. PCT/JP2018/003809.
Aug. 28, 2020, the Extended European Search Report issued by the European Patent Office in the corresponding European Patent Application No. 18748480.3.

(Continued)

*Primary Examiner* — Hai Vo
(74) *Attorney, Agent, or Firm* — Kenja IP Law PC

(57) ABSTRACT

Provided is a vinyl chloride resin composition that enables production of a vinyl chloride resin molded product having a desired dark color tone and excellent heat shielding. The vinyl chloride resin composition contains a vinyl chloride resin (a), a plasticizer (b), and a heat-shielding pigment (c). The heat-shielding pigment (c) has an L* value of not lower than 18.0 and not higher than 70.0 in the L*a*b* color system and exhibits a spectral reflectance curve on which a wavelength where reflectance is 20% or more is present in a wavelength region of 800 nm to 2400 nm.

10 Claims, No Drawings

(56) References Cited

OTHER PUBLICATIONS

Makarewicz Edwin et al., "Badania reologiczne plastizoli poli(chlorku winylu) barwionych nieorganicznymi pigmentami—[Rheological studies of poly(vinyl chloride) plastisol dyed with inorganic pigments]", Przemysl Chemiczny, Wydawnictwo Sigma, PL, vol. 90, No. 1, Jan. 1, 2011, pp. 122-127, XP009521026, ISSN: 0033-2496. Apr. 14, 2021, Communication pursuant to Article 94(3) EPC issued by the European Patent Office in the corresponding European Patent Application No. 18748480.3.

* cited by examiner

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins are used in a variety of applications due to generally having excellent characteristics in terms of cold resistance, heat resistance, oil resistance, and so forth.

Specifically, automobile interior materials such as a surface skin formed by a vinyl chloride resin molded product and a laminate obtained by lining a surface skin formed by a vinyl chloride resin molded product with a foamed product such as foamed polyurethane are used in the formation of automobile interior components such as automobile instrument panels and door trims.

There is demand for a vinyl chloride resin molded product forming a surface skin of an automobile interior component such as an automobile instrument panel to display high heat shielding in order that sunlight or the like that has entered an automobile does not cause a rise in temperature of the automobile interior component itself and of the internal environment of the automobile.

In Patent Literature (PTL) 1, for example, heat shielding of an automobile interior material having polyester nonwoven fabric as a surface skin is increased by lining the surface skin with a resin sheet that displays heat shielding. The heat-shielding resin sheet in PTL 1 is produced using a polyvinyl acetal resin, a plasticizer, and tin-doped indium oxide particles.

CITATION LIST

Patent Literature

PTL 1: JP 2005-206118 A

SUMMARY

Technical Problem

However, in the conventional technique of lining with a resin sheet described above, there is room for further improvement in terms of causing a surface skin portion used as an automobile interior material to display high heat shielding.

In particular, surface skins formed by vinyl chloride resin molded products having black coloring (blackish dark coloring) have been used in recent years as the base material for automobile interior materials that give an impression of high quality. Molded products having a large additive amount of carbon black, which generally has a high tendency for heat buildup, are often used as such vinyl chloride resin molded products having black coloring. For this reason, there has been demand for increasing heat shielding of a surface skin formed by a vinyl chloride resin molded product while still obtaining a similar color tone to when carbon black is added.

Accordingly, an objective of the present disclosure is to provide a vinyl chloride resin composition that enables production of a vinyl chloride resin molded product having a desired dark color tone and excellent heat shielding.

Another objective of the present disclosure is to provide a vinyl chloride resin molded product and a laminate having a desired dark color tone and excellent heat shielding.

Solution to Problem

The inventor conducted diligent investigation with the aim of solving the problems set forth above. Through this investigation, the inventor discovered that by using a vinyl chloride resin composition containing a vinyl chloride resin, a plasticizer, and a heat-shielding pigment having a specific lightness and a specific reflectance, it is possible to obtain a vinyl chloride resin molded product that has a desired dark color tone and excellent heat shielding, and that can suitably be used as an automobile interior material such as a surface skin for an automobile instrument panel. In this manner, the inventor completed the present disclosure.

Specifically, the present disclosure aims to advantageously solve the problems set forth above by disclosing a vinyl chloride resin composition comprising a vinyl chloride resin (a), a plasticizer (b), and a heat-shielding pigment (c), wherein the heat-shielding pigment (c) has an $L^*$ value of not lower than 18.0 and not higher than 70.0 in the $L^*a^*b^*$ color system and exhibits a spectral reflectance curve on which a wavelength where reflectance is 20% or more is present in a wavelength region of 800 nm to 2400 nm. Through compounding of the heat-shielding pigment (c) having an $L^*$ value in the specific range set forth above and a reflectance of not less than the specific value set forth above, a vinyl chloride resin molded product having a desired dark color tone and excellent heat shielding can be formed. Moreover, this vinyl chloride resin molded product can suitably be used, for example, as an automobile interior material (for example, a surface skin for an automobile instrument panel) having a desired dark color.

Note that the "$L^*$ value" referred to in the present disclosure is a value that expresses lightness in the $L^*a^*b^*$ color system defined by the International Commission on Illumination (CIE). The "$L^*$ value" can be measured in accordance with a method described in the EXAMPLES section of the present description.

Moreover, the "spectral reflectance curve" referred to in the present disclosure can be obtained using a spectrophotometer.

In the presently disclosed vinyl chloride resin composition, the heat-shielding pigment (c) is preferably a metal complex oxide including at least two metal elements selected from the group consisting of Mn, Bi, Fe, and Cr. This is because a vinyl chloride resin molded product having better heat shielding can be formed while also favorably obtaining a desired dark color tone when the heat-shielding pigment (c) is the specific metal complex oxide set forth above.

In the presently disclosed vinyl chloride resin composition, the heat-shielding pigment (c) is preferably a metal complex oxide that is either a Mn—Bi complex oxide or an Fe—Cr complex oxide. This is because a vinyl chloride resin molded product having even better heat shielding can be formed while also more favorably obtaining a desired dark color tone when the heat-shielding pigment (c) is the specific metal complex oxide set forth above.

In the presently disclosed vinyl chloride resin composition, content of the heat-shielding pigment (c) is preferably 5 parts by mass or more per 100 parts by mass of the vinyl chloride resin (a). This is because a vinyl chloride resin molded product having better heat shielding can be formed while also favorably obtaining a desired dark color tone when the vinyl chloride resin composition contains not less than the specific amount of the heat-shielding pigment (c) set forth above.

In the presently disclosed vinyl chloride resin composition, content of carbon black is preferably 0.1 parts by mass or less per 100 parts by mass of the heat-shielding pigment (c). This is because a vinyl chloride resin molded product having even better heat shielding can be formed when the content of carbon black, which may be contained in the vinyl chloride resin composition, is not more than the specific amount set forth above.

Note that since the presently disclosed vinyl chloride resin composition contains the specific heat-shielding pigment (c), a desired dark color tone can be achieved in a vinyl chloride resin molded product even when the content of carbon black is not more than the specific amount set forth above.

The presently disclosed vinyl chloride resin composition is preferably used in powder molding. This is because a vinyl chloride resin molded product that can favorably be used as an automobile interior material such as a surface skin for an automobile instrument panel, for example, can easily be obtained by using the vinyl chloride resin composition in powder molding.

Moreover, the presently disclosed vinyl chloride resin composition is preferably used in powder slush molding. This is because a vinyl chloride resin molded product that can favorably be used as an automobile interior material such as a surface skin for an automobile instrument panel, for example, can more easily be obtained by using the vinyl chloride resin composition in powder slush molding.

The present disclosure also aims to advantageously solve the problems set forth above by disclosing a vinyl chloride resin molded product obtained through molding of any one of the vinyl chloride resin compositions set forth above. By forming a vinyl chloride resin molded product using the vinyl chloride resin composition, it is possible to obtain a vinyl chloride resin molded product that has a desired dark color tone and excellent heat shielding, and that can suitably be used, for example, as an automobile interior material such as a surface skin for an automobile instrument panel.

A surface of the presently disclosed vinyl chloride resin molded product preferably has an L* value of 23.0±2.5, an a* value of −0.5±1.0, and a b* value of 0.0±1.0 in the L*a*b* color system. This is because a vinyl chloride resin molded product that can suitably be used as an automobile interior material (for example, a surface skin for an automobile instrument panel) having a desired blackish dark color tone can be obtained when the L*, a*, and b* values of the surface of the vinyl chloride resin molded product are within the ranges set forth above.

Note that the "a* value" and "b* value" referred to in the present disclosure are values that express chromaticity (hue and saturation) in the L*a*b* color system defined by the International Commission on Illumination (CIE). The "a* value" and "b* value" can be measured in accordance with a method described in the EXAMPLES section of the present description.

The presently disclosed vinyl chloride resin molded product is preferably for a surface skin of an automobile interior component. This is because an automobile interior component (for example, an automobile instrument panel) including a surface skin having a desired dark color tone and excellent heat shielding can be obtained when the vinyl chloride resin molded product is used as the surface skin of the automobile interior component.

The present disclosure also aims to advantageously solve the problems set forth above by disclosing a laminate comprising: a foamed polyurethane molded product; and any one of the vinyl chloride resin molded products set forth above. The laminate including the foamed polyurethane molded product and the vinyl chloride resin molded product set forth above can suitably be used as an automobile interior material used in production of an automobile interior component (for example, an automobile instrument panel) having a surface that displays a desired dark color tone and has excellent heat shielding.

Advantageous Effect

According to the present disclosure, a vinyl chloride resin composition that enables production of a vinyl chloride resin molded product having a desired dark color tone and excellent heat shielding is obtained.

Moreover, according to the present disclosure, a vinyl chloride resin molded product and a laminate having a desired dark color tone and excellent heat shielding are obtained.

DETAILED DESCRIPTION

The following provides a detailed description of embodiments of the present disclosure.

The presently disclosed vinyl chloride resin composition can be used, for example, in formation of the presently disclosed vinyl chloride resin molded product. Moreover, a vinyl chloride resin molded product formed using the presently disclosed vinyl chloride resin composition can suitably be used, for example, as an automobile interior material such as a surface skin included in an automobile interior component such as an automobile instrument panel or a door trim. In particular, a vinyl chloride resin molded product formed using the presently disclosed vinyl chloride resin composition can more suitably be used as an automobile interior material such as a surface skin having a blackish dark color.

The presently disclosed vinyl chloride resin molded product can be used, for example, in formation of the presently disclosed laminate. Moreover, a laminate formed using the presently disclosed vinyl chloride resin molded product can suitably be used, for example, as an automobile interior material used in production of an automobile interior component such as an automobile instrument panel or a door trim. In particular, a laminate formed using the presently disclosed vinyl chloride resin molded product can more suitably be used as an automobile interior material used in production of an automobile interior component including a surface skin having a blackish dark color.

(Vinyl Chloride Resin Composition)

The presently disclosed vinyl chloride resin composition contains a vinyl chloride resin (a), a plasticizer (b), and a heat-shielding pigment (c), and may optionally further contain other pigments (d) and additives. A feature of the heat-shielding pigment (c) contained in the presently disclosed vinyl chloride resin composition is that the heat-shielding pigment (c) has a lightness within a specific range and a reflectance of not less than a specific value. As a result of the presently disclosed vinyl chloride resin composition containing at least the vinyl chloride resin (a), the plasticizer (b), and the heat-shielding pigment (c) having the specific properties mentioned above, the presently disclosed vinyl chloride resin composition can be used to form a vinyl chloride resin molded product having excellent heat shielding while also ensuring a desired dark color tone. Therefore, by using the presently disclosed vinyl chloride resin composition, it is possible to obtain a vinyl chloride resin molded product that is particularly suitable as an automobile interior material (for example, a surface skin for an automobile instrument panel or door trim) that can display excellent heat shielding even though it has a desired dark color tone.

Note that from a viewpoint of easily obtaining a vinyl chloride resin molded product that can favorably be used as an automobile interior material using the presently disclosed vinyl chloride resin composition, for example, the presently disclosed vinyl chloride resin composition is preferably used in powder molding, and is more preferably used in powder slush molding.

<Vinyl Chloride Resin (a)>

The vinyl chloride resin composition may, for example, contain one type or two or more types of vinyl chloride resin particles as the vinyl chloride resin (a), and may optionally further contain one type or two or more types of vinyl chloride resin fine particles as the vinyl chloride resin (a). In particular, the vinyl chloride resin (a) preferably includes at least vinyl chloride resin particles, and more preferably includes vinyl chloride resin particles and vinyl chloride resin fine particles.

The vinyl chloride resin (a) may be produced by any production method known in the art such as suspension polymerization, emulsion polymerization, solution polymerization, or bulk polymerization.

The present description uses the term "resin particles" to refer to particles with a particle diameter of 30 μm or more, and the term "resin fine particles" to refer to particles with a particle diameter of less than 30 μm.

Examples of the vinyl chloride resin (a) include homopolymers composed of vinyl chloride monomer units and also vinyl chloride-based copolymers preferably comprising 50 mass % or more of vinyl chloride monomer units, and more preferably 70 mass % or more of vinyl chloride monomer units. Specific examples of monomers (comonomers) that are copolymerizable with vinyl chloride monomer and may be used to form a vinyl chloride-based copolymer include those described in WO 2016/098344 A1, for example. One of these components may be used individually, or two or more of these components may be used in combination in a freely selected ratio.

<<Vinyl Chloride Resin Particles>>

In the vinyl chloride resin composition, the vinyl chloride resin particles normally function as a matrix resin (base material). The vinyl chloride resin particles are preferably produced by suspension polymerization.

[Average Degree of Polymerization]

The average degree of polymerization of a vinyl chloride resin forming the vinyl chloride resin particles is preferably 1,000 or more, and is preferably 3,000 or less. When the average degree of polymerization of the vinyl chloride resin forming the vinyl chloride resin particles is not less than the lower limit set forth above, sufficient physical strength of a vinyl chloride resin molded product formed using the vinyl chloride resin composition can be ensured while also improving tensile characteristics (particularly tensile elongation), for example. A vinyl chloride resin molded product having good tensile elongation can suitably be used as an automobile interior material (for example, a surface skin of an automobile instrument panel) that has good ductility and that ruptures as designed without scattering of fragments when an airbag expands and is deployed, for example. Moreover, when the average degree of polymerization of the vinyl chloride resin forming the vinyl chloride resin particles is not more than the upper limit set forth above, meltability of the vinyl chloride resin composition can be improved, and surface smoothness of a vinyl chloride resin molded product formed using the composition can also be improved.

The "average degree of polymerization" referred to in the present disclosure can be measured in accordance with JIS K6720-2.

[Average Particle Diameter]

The average particle diameter of the vinyl chloride resin particles is normally 30 μm or more, preferably 50 μm or more, and more preferably 100 μm or more, and is preferably 500 μm or less, and more preferably 200 μm or less. This is because powder fluidity of the vinyl chloride resin composition can be further improved when the average particle diameter of the vinyl chloride resin particles is not less than any of the lower limits set forth above. Moreover, meltability of the vinyl chloride resin composition further improves and surface smoothness of a vinyl chloride resin molded product formed using the composition can be further improved when the average particle diameter of the vinyl chloride resin particles is not more than any of the upper limits set forth above.

The "average particle diameter" referred to in the present disclosure can be measured as the volume-average particle diameter by laser diffraction in accordance with JIS Z8825.

[Percentage Content]

The percentage content of the vinyl chloride resin particles among the vinyl chloride resin (a) is preferably 70 mass % or more, and more preferably 80 mass % or more, may be 100 mass %, and is preferably 95 mass % or less, and more preferably 90 mass % or less. When the percentage content of the vinyl chloride resin particles among the vinyl chloride resin (a) is not less than any of the lower limits set forth above, sufficient physical strength of a vinyl chloride resin molded product formed using the vinyl chloride resin composition can be ensured while also improving tensile elongation. Moreover, when the percentage content of the vinyl chloride resin particles among the vinyl chloride resin (a) is not more than any of the upper limits set forth above, powder fluidity of the vinyl chloride resin composition improves.

<<Vinyl Chloride Resin Fine Particles>>

In the vinyl chloride resin composition, the vinyl chloride resin fine particles normally function as a dusting agent (powder fluidity modifier). The vinyl chloride resin fine particles are preferably produced by emulsion polymerization.

[Average Degree of Polymerization]

The average degree of polymerization of a vinyl chloride resin forming the vinyl chloride resin fine particles is preferably 500 or more, and more preferably 700 or more, and is preferably 1,000 or less, and more preferably 900 or less. When the average degree of polymerization of the vinyl chloride resin forming the vinyl chloride resin fine particles used as a dusting agent is not less than any of the lower limits set forth above, powder fluidity of the vinyl chloride resin composition improves, and tensile elongation of a molded product obtained using the composition improves. Moreover, when the average degree of polymerization of the vinyl chloride resin forming the vinyl chloride resin fine particles is not more than any of the upper limits set forth above, meltability of the vinyl chloride resin composition further improves, and surface smoothness of a vinyl chloride resin molded product formed using the composition further improves.

[Average Particle Diameter]

The average particle diameter of the vinyl chloride resin fine particles is normally less than 30 μm, preferably 10 μm or less, and more preferably 5 µm or less, and is preferably 0.1 µm or more, and more preferably 1 µm or more. When the average particle diameter of the vinyl chloride resin fine particles is not less than any of the lower limits set forth above, the vinyl chloride resin fine particles are not too small to function as a dusting agent, for example, and the vinyl chloride resin composition can display even better powder fluidity. Moreover, when the average particle diameter of the vinyl chloride resin fine particles is not more than any of the upper limits set forth above, meltability of the vinyl chloride resin composition increases, and surface smoothness of a vinyl chloride molded product formed therewith can be further improved.

[Percentage Content]

The percentage content of the vinyl chloride resin fine particles among the vinyl chloride resin (a) may be 0 mass %, but is preferably 5 mass % or more, and more preferably 10 mass % or more, and is preferably 30 mass % or less, and more preferably 20 mass % or less. This is because powder fluidity of the vinyl chloride resin composition further improves when the percentage content of the vinyl chloride resin fine particles among the vinyl chloride resin (a) is not less than any of the lower limits set forth above. Moreover, physical strength of a vinyl chloride resin molded product formed using the vinyl chloride resin composition can be further increased when the percentage content of the vinyl chloride resin fine particles among the vinyl chloride resin (a) is not more than any of the upper limits set forth above.

<Plasticizer (b)>

Any of the primary plasticizers, secondary plasticizers, or the like described in WO 2016/098344 A1, for example, may be used as the plasticizer (b). One of these components may be used individually, or two or more of these components may be used in combination in a freely selected ratio.

Of these plasticizers, it is preferable to use at least a primary plasticizer and more preferable to use both a primary plasticizer and a secondary plasticizer as the plasticizer (b) from a viewpoint of making it easy to favorably obtain a vinyl chloride resin composition and a vinyl chloride resin molded product. Specifically, it is preferable that a trimellitic acid ester and/or pyromellitic acid ester is used as the plasticizer (b), more preferable that at least a trimellitic acid ester is used as the plasticizer (b), and even more preferable that a trimellitic acid ester and epoxidized soybean oil are used in combination as the plasticizer (b).

[Content]

The content of the plasticizer (b) per 100 parts by mass of the vinyl chloride resin (a) is preferably 10 parts by mass or more, more preferably 60 parts by mass or more, and even more preferably 80 parts by mass or more, and is preferably 200 parts by mass or less, more preferably 160 parts by mass or less, and even more preferably 120 parts by mass or less. Tensile elongation of a vinyl chloride resin molded product formed using the vinyl chloride resin composition can be sufficiently increased when the content of the plasticizer (b) is not less than any of the lower limits set forth above. Moreover, stickiness of the surface of a vinyl chloride resin molded product due to plasticizer migrating to the surface of the molded product can be suppressed when the content of the plasticizer (b) is not more than any of the upper limits set forth above.

<Heat-Shielding Pigment (c)>

The heat-shielding pigment (c) contained in the presently disclosed vinyl chloride resin composition has an L* value that is within a specific range and a reflectance that is not less than a specific value. If the vinyl chloride resin composition does not contain the heat-shielding pigment (c) having these specific properties, it is not possible to impart a desired dark color tone and excellent heat shielding on a vinyl chloride resin molded product formed using the vinyl chloride resin composition.

<<L* Value, a* Value, and b* Value>>

[L* Value]

In the L*a*b* color system, an L* value of the heat-shielding pigment (c) is required to be not lower than 18.0 and not higher than 70.0. Moreover, the L* value of the heat-shielding pigment (c) is preferably 19.0 or higher, more preferably 20.0 or higher, and even more preferably 21.0 or higher, and is preferably 60.0 or lower, more preferably 50.0 or lower, even more preferably 40.0 or lower, even more preferably 25.0 or lower, even more preferably 23.5 or lower, even more preferably 23.0 or lower, further preferably 22.5 or lower, and even further preferably 22.0 or lower. An L* value closer to 100 indicates a lighter color, whereas an L* value closer to 0 indicates a darker color. Thus, a desired dark color tone cannot be imparted on a vinyl chloride resin molded product formed using the vinyl chloride resin composition if the L* value of the heat-shielding pigment (c) is not within any of the upper limit ranges set forth above. Therefore, when the L* value of the heat-shielding pigment (c) is within any of the ranges set forth, the molded product can favorably be used for a surface skin of an automobile instrument panel or the like having a desired dark color. This is because the color tone of a vinyl chloride resin molded product can be adjusted to a more desirable darkness when the L* value of the heat-shielding pigment (c) is not higher than any of the upper limits set forth above. Moreover, higher heat shielding can be imparted on a vinyl chloride resin molded product when the L* value of the heat-shielding pigment (c) is not lower than any of the lower limits set forth above.

[a* Value]

In the L*a*b* color system, an a* value of the heat-shielding pigment (c) is preferably −1.0 or higher, more preferably 0.0 or higher, even more preferably 0.5 or higher, and further preferably 1.1 or higher, and is preferably 2.0 or lower. A more positive a* value indicates stronger redness, whereas a more negative a* value indicates stronger greenness. Thus, a desirable color tone that is more suitable for a surface skin of an automobile instrument panel or the like can be imparted on a vinyl chloride resin molded product, for example, when the a* value of the heat-shielding pigment (c) is within any of the ranges set forth above.

[b* Value]

In the L*a*b* color system, a b* value of the heat-shielding pigment (c) is preferably 0.0 or higher, more preferably 0.5 or higher, and even more preferably 1.0 or higher, and is preferably 4.0 or lower, more preferably 3.0 or lower, and even more preferably 1.5 or lower. A more positive b* value indicates stronger yellowness, whereas a more negative b* value indicates stronger blueness. Thus, a desirable color tone that is more suitable for a surface skin of an automobile instrument panel or the like can be imparted on a vinyl chloride resin molded product, for example, when the b* value of the heat-shielding pigment (c) is within any of the ranges set forth above.

<<Reflectance>>

For the heat-shielding pigment (c), it is a requirement that a wavelength where reflectance is 20% or more is present on a spectral reflectance curve in a wavelength region of 800 nm to 2400 nm. Moreover, for the heat-shielding pigment (c), there is preferably a wavelength where reflectance is 40% or more, and more preferably a wavelength where reflectance is 60% or more on the spectral reflectance curve in the wavelength region of 800 nm to 2400 nm. Furthermore, the average reflectance of the heat-shielding pigment (c) in the wavelength region of 800 nm to 2400 nm on the spectral reflectance curve is preferably 20% or more, more preferably 30% or more, even more preferably 40% or more, and further preferably 50% or more. The reflectance of the heat-shielding pigment (c) is normally 100% or less.

If a wavelength at which reflectance of the heat-shielding pigment (c) is 20% or more is not present on the spectral reflectance curve in the wavelength region of 800 nm to 2400 nm, sufficient heat shielding cannot be imparted on the surface of a vinyl chloride resin molded product formed using the vinyl chloride resin composition. Moreover, when the reflectance and average reflectance displayed by the heat-shielding pigment (c) are not less than any of the lower limits set forth above, reflectance of a vinyl chloride resin molded product with respect to infrared light increases, which enables a higher heat-shielding effect with respect to heat from sunlight, artificial illumination, and the like in a situation in which, for example, the molded product is used as a surface skin of an automobile instrument panel or the like. By using a vinyl chloride resin molded product that has excellent heat shielding as an automobile interior component in this manner, for example, it is possible to achieve a better in-vehicle environment.

The "average reflectance" referred to in the present disclosure can be calculated from the above-described spectral reflectance curve obtained using a spectrophotometer by using the reflectance at each wavelength to determine an arithmetic average.

<<Particle Diameter>>

The particle diameter of the heat-shielding pigment (c), in terms of median diameter (D50), is preferably 100 μm or less, more preferably 30 μm or less, even more preferably 5 μm or less, and further preferably 3 μm or less, and is preferably 0.1 μm or more, and more preferably 0.5 μm or more. When the particle diameter of the heat-shielding pigment (c) is not more than any of the upper limits set forth above, heat shielding of a vinyl chloride resin molded product formed using the vinyl chloride resin composition can be further improved because reflectance of the heat-shielding pigment (c) with respect to infrared light further increases. Moreover, when the particle diameter of the heat-shielding pigment (c) is not less than any of the lower limits set forth above, handleability of the heat-shielding pigment (c) and powder fluidity of the vinyl chloride resin composition can be increased.

The "median diameter" referred to in the present disclosure can be determined in accordance with a method described in the EXAMPLES section of the present description.

<<Chemical Composition>>

Although no specific limitations are placed on the chemical composition of the heat-shielding pigment (c), the heat-shielding pigment (c) is preferably a metal complex oxide including at least two metal elements selected from the group consisting of Mn, Bi, Fe, and Cr, more preferably includes at least one metal complex oxide from among a Mn—Bi complex oxide and an Fe—Cr complex oxide, and is even more preferably a metal complex oxide that is either a Mn—Bi complex oxide or an Fe—Cr complex oxide. Moreover, the heat-shielding pigment (c) may be one type of pigment used individually or two or more types of pigments used in combination.

When the chemical composition of the heat-shielding pigment (c) is as set forth above, heat shielding of a vinyl chloride resin molded product formed using the vinyl chloride resin composition can be further improved because reflectance of the heat-shielding pigment (c), and particularly reflectance with respect to infrared light, increases. Moreover, when the chemical composition of the heat-shielding pigment (c) is as set forth above, a desired dark color tone can more favorably be imparted on a vinyl chloride resin molded product formed using the vinyl chloride resin composition.

Note that when the heat-shielding pigment (c) is described as being a metal complex oxide in the present disclosure, this means that the percentage content of a metal complex oxide among the heat-shielding pigment (c) is 90 mass % or more, and that it is preferable that the heat-shielding pigment (c) does not further include components other than impurities that become unavoidably included therein during production.

<<Content>>

The content of the heat-shielding pigment (c) per 100 parts by mass of the previously described vinyl chloride resin (a) is preferably 1 part by mass or more, more preferably 5 parts by mass or more, and even more preferably 6 parts by mass or more, and is preferably 10 parts by mass or less, and more preferably 8 parts by mass or less. This is because a more desirable dark color tone can be imparted on a vinyl chloride resin molded product formed using the vinyl chloride resin composition while also further increasing heat shielding when the content of the heat-shielding pigment (c) is not less than any of the lower limits set forth above. Moreover, tensile elongation of a vinyl chloride resin molded product can favorably be maintained when the content of the heat-shielding pigment (c) is not less than any of the lower limits set forth above.

<Other Pigments (d)>

Pigments other than the heat-shielding pigment (c) set forth above may be used without any specific limitations as other pigments (d) that may be further contained in the presently disclosed vinyl chloride resin composition.

Specific examples of such other pigments (d) include quinacridone-based pigments, perylene-based pigments, condensed polyazo pigments, isoindolinone-based pigments, phthalocyanine-based pigments, and carbon black. Any one of these pigments or any two or more of these pigments may be used.

A quinacridone-based pigment is obtained through concentrated sulfuric acid treatment of a p-phenylene dianthranilic acid and has a hue from yellowish red to reddish purple. Specific examples of quinacridone-based pigments include quinacridone red, quinacridone magenta, and quinacridone violet.

A perylene-based pigment is obtained through a condensation reaction of perylene-3,4,9,10-tetracarboxylic anhydride and an aromatic primary amine and has a hue from red to red-purple/brown. Specific examples of perylene-based pigments include perylene red, perylene orange, perylene maroon, perylene vermilion, and perylene bordeaux.

A condensed polyazo pigment is obtained through condensation of an azo dye in a solvent to achieve a high molecular weight and has a hue of a yellow or red pigment. Specific examples of condensed polyazo pigments include polyazo red, polyazo yellow, chromophthal orange, chromophthal red, and chromophthal scarlet.

An isoindolinone-based pigment is obtained through a condensation reaction of 4,5,6,7-tetrachloroisoindolinone and an aromatic primary diamine and has a hue from greenish yellow to red/brown. A specific example of an isoindolinone-based pigment is isoindolinone yellow.

A phthalocyanine-based pigment is a pigment in which copper is coordinated with a phthalocyanine and has a hue from yellowish green to bright blue. Specific examples of phthalocyanine-based pigments include phthalocyanine copper such as phthalocyanine blue and highly chlorinated copper phthalocyanine such as phthalocyanine green (pigment green 7).

Carbon black is a black pigment having carbon as a main component and also including oxygen, hydrogen, and nitrogen. Specific examples of carbon black include thermal black, acetylene black, channel black, furnace black, lamp black, and bone black.

<<Content>>

The content of other pigments (d) per 100 parts by mass of the heat-shielding pigment (c) is preferably 30 parts by mass or less, and more preferably 20 parts by mass or less, and may be 0 parts by mass. This is because heat shielding of a vinyl chloride resin molded product formed using the vinyl chloride resin composition can be further increased when the content of other pigments (d) is not more than any of the upper limits set forth above.

Other these pigments (d), carbon black generally has a high tendency for heat buildup. For this reason, the content of carbon black as another pigment (d) per 100 parts by mass of the heat-shielding pigment (c) is preferably 0.1 parts by mass or less, more preferably 0.05 parts by mass or less, and even more preferably 0 parts by mass (i.e., carbon black is not included).

<Additives>

The presently disclosed vinyl chloride resin composition may further contain various additives besides the components set forth above. Examples of additives that may be used include, but are not specifically limited to, stabilizers such as perchloric acid-treated hydrotalcite, zeolites, β-diketones, and fatty acid metal salts; mold release agents; dusting agents other than the previously described vinyl chloride resin fine particles; impact modifiers; perchloric acid compounds other than perchloric acid-treated hydrotalcite (for example, sodium perchlorate and potassium perchlorate); antioxidants; fungicides; flame retardants; antistatic agents; fillers; light stabilizers; and foaming agents.

Examples of perchloric acid-treated hydrotalcite, zeolites, β-diketones, fatty acid metal salts, mold release agents, other dusting agents, impact modifiers, perchloric acid compounds other than perchloric acid-treated hydrotalcite, antioxidants, fungicides, flame retardants, antistatic agents, fillers, light stabilizers, and foaming agents that the presently disclosed vinyl chloride resin composition may contain include those described in WO 2016/098344 A1, for example, and suitable amounts thereof may also be the same as described.

<Production Method of Vinyl Chloride Resin Composition>

The presently disclosed vinyl chloride resin composition can be produced by mixing the components described above.

Although no specific limitations are placed on the method by which the vinyl chloride resin (a), the plasticizer (b), the heat-shielding pigment (c), and, as necessary, other pigments (d) and various additives are mixed, a method in which components other than a dusting agent (inclusive of vinyl chloride resin fine particles) are mixed by dry blending and then the dusting agent is subsequently added and mixed therewith may be adopted, for example. The dry blending is preferably carried out using a Henschel mixer. Although the temperature during dry blending is not specifically limited, the temperature is preferably 50° C. or higher, and more preferably 70° C. or higher, and is preferably 200° C. or lower.

<Use of Vinyl Chloride Resin Composition>

The obtained vinyl chloride resin composition can suitably be used in powder molding, and can more suitably be used in powder slush molding.

(Vinyl Chloride Resin Molded Product)

A feature of the presently disclosed vinyl chloride resin molded product is that it is obtained by molding the vinyl chloride resin composition set forth above by any method. As a result of the presently disclosed vinyl chloride resin molded product being formed using any one of the vinyl chloride resin compositions set forth above and containing at least a vinyl chloride resin (a), a plasticizer (b), and a heat-shielding pigment (c) having the specific properties set forth above, the presently disclosed vinyl chloride resin molded product has a desired dark color tone and excellent heat shielding. In particular, the vinyl chloride resin molded product can display excellent heat shielding even when is has a blackish dark color.

Therefore, the presently disclosed vinyl chloride resin molded product can suitably be used for a surface skin of an automobile interior component and, in particular, can more suitably be used for a surface skin of an automobile instrument panel or the like having a desired dark color.

<<$L^*$ Value, $a^*$ Value, and $b^*$ Value>>

In the $L^*a^*b^*$ color system, an $L^*$ value of the surface of the presently disclosed vinyl chloride resin molded product in an initial (unheated post-molding) state is preferably 20.5 or higher, more preferably 21.0 or higher, even more preferably 21.7 or higher, and particularly preferably 21.8 or higher, and is preferably 25.5 or lower, more preferably 25.0 or lower, even more preferably 23.7 or lower, and particularly preferably 23.5 or lower. Moreover, in the $L^*a^*b^*$ color system, an $a^*$ value of the surface of the presently disclosed vinyl chloride resin molded product in an initial (unheated post-molding) state is preferably −1.5 or higher, and more preferably −1.0 or higher, and is preferably 0.5 or lower, and more preferably 0.0 or lower. Moreover, in the $L^*a^*b^*$ color system, a $b^*$ value of the surface of the presently disclosed vinyl chloride resin molded product in an initial (unheated post-molding) state is preferably −1.0 or higher, and more preferably −0.5 or higher, and is preferably 1.0 or lower, and more preferably 0.5 or lower. Furthermore, it is more preferable that in the $L^*a^*b^*$ color system, at least the $L^*$ value of the surface of the presently disclosed vinyl chloride resin molded product in an initial (unheated post-molding) state is within any of the ranges set forth above, and even more preferable that the $L^*$ value, the $a^*$ value, and the $b^*$ value are each within any of the ranges set forth above. The vinyl chloride resin molded product more favorably has a desired blackish dark color tone when the $L^*$ value, the $a^*$ value, and the $b^*$ value of the surface of the vinyl chloride resin molded product are each within any of the ranges set forth above. Consequently, the vinyl chloride resin molded product can more suitably be used as an automobile interior material such as a surface skin of an automobile instrument panel having an aesthetically pleasing design.

A vinyl chloride resin molded product having a dark color tone generally has a high tendency for heat buildup as previously described. However, as a result of the presently disclosed vinyl chloride resin molded product containing at least a vinyl chloride resin (a), a plasticizer (b), and a heat-shielding pigment (c) having the specific properties set forth above, the presently disclosed vinyl chloride resin molded product can display excellent heat shielding even when it has a blackish dark color.

It is also preferable that the L* value, the a* value, and the b* value of the surface of the presently disclosed vinyl chloride resin molded product do not significantly change even when the vinyl chloride resin molded product is left at high temperature for a long time. In a case in which the L* value, the a* value, and the b* value of the surface of the vinyl chloride resin molded product do not change even in a harsh environment such as described above, the vinyl chloride resin molded product can, for example, be used even more suitably as an automobile interior material that is resistant to heat aging.

From this viewpoint, it is preferable that the surface of the presently disclosed vinyl chloride resin molded product has an L* value of not lower than 20.5 and not higher than 25.5 even after the vinyl chloride resin molded product is heated by being left in an environment having a temperature of 130° C. for 100 hours, for example. The surface of the presently disclosed vinyl chloride resin molded product also preferably has an a* value of not lower than −1.5 and not higher than 0.5 even after being heated as described above. Moreover, the surface of the presently disclosed vinyl chloride resin molded product preferably has a b* value of not lower than −1.0 and not higher than 1.0 even after being heated as described above. Furthermore, it is more preferable that at least the L* value of the surface of the presently disclosed vinyl chloride resin molded product is within the range set forth above even after being heated as described above, and even more preferable that the L* value, the a* value, and the b* value of the surface of the presently disclosed vinyl chloride resin molded product are each within the range set forth above even after being heated as described above.

<<Formation Method of Vinyl Chloride Resin Molded Product>>

Although no specific limitations are placed on the mold temperature in powder slush molding in a situation in which the vinyl chloride resin molded product is formed by powder slush molding, the mold temperature is preferably 200° C. or higher, and more preferably 220° C. or higher, and is preferably 300° C. or lower, and more preferably 280° C. or lower.

The following method, for example, may be used in production of the vinyl chloride resin molded product without any specific limitations. In this method, the presently disclosed vinyl chloride resin composition is sprinkled onto a mold having a temperature within any of the ranges set forth above. The vinyl chloride resin composition is initially left for not less than 5 seconds and not more than 30 seconds and, after shaking off any excess vinyl chloride resin composition, is then further left for not less than 30 seconds and not more than 3 minutes at any temperature. The mold is subsequently cooled to a temperature of not lower than 10° C. and not higher than 60° C., and the presently disclosed vinyl chloride resin molded product that is obtained is removed from the mold. A sheet-like molded product that imitates the shape of the mold is obtained.

(Laminate)

The presently disclosed laminate includes a foamed polyurethane molded product and any one of the vinyl chloride resin molded products set forth above. The vinyl chloride resin molded product typically constitutes one surface of the laminate.

As a result of the presently disclosed laminate including a vinyl chloride resin molded product formed using the presently disclosed vinyl chloride resin composition, a surface of the presently disclosed laminate at the side corresponding to this molded product has excellent heat shielding, for example. Therefore, the presently disclosed laminate can suitably be used as an automobile interior material forming an automobile interior component such as an automobile instrument panel or a door trim, for example, and, in particular, can suitably be used as an automobile interior material forming an automobile interior component having a desired dark color.

The method by which the foamed polyurethane molded product and the vinyl chloride resin molded product are stacked is not specifically limited and may, for example, be a method such as described below. Specifically, (1) a method in which the foamed polyurethane molded product and the vinyl chloride resin molded product are separately prepared and are subsequently adhered to one another by thermal fusion bonding, thermal adhesion, or using a commonly known adhesive, or (2) a method in which raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product may be adopted. The latter method (2) is more suitable because it involves a simple process and enables laminates of various different shapes to be obtained while easily achieving strong adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the color tone (L* value, a* value, and b* value), reflectance, and particle diameter of a heat-shielding pigment (c) and other pigments (d); the surface color tone (L* value, a* value, and b* value) and low-temperature tensile characteristics of a vinyl chloride resin molded product; and the heat shielding of a vinyl chloride resin molded product in a laminate.

<Color Tone of Heat-Shielding Pigment (c) and Other Pigments (d)>

A chroma meter (produced by Konica Minolta, Inc.; product name: CR-400; C illuminant) was used to measure an L* value, an a* value, and a b* value in the L*a*b* color system defined by CIE with respect to each heat-shielding pigment (c) and other pigment (d) shown in Table 1.

Note that the L* value, a* value, and b* value were each taken to be an average value of values measured at three arbitrary locations in the pigment.

<Reflectance>

A spectrophotometer (produced by Hitachi High-Tech Science Corporation; product name: U-4100) was used to obtain a spectral reflectance curve for each heat-shielding pigment (c) and other pigment (d) shown in Table 1. It was then confirmed whether or not a wavelength where reflectance was 20% or more was present from the reflectance (vertical axis, %) in a region of the obtained spectral reflectance curve corresponding to a wavelength (horizontal axis, nm) of 800 nm to 2400 nm.

In addition, the average reflectance (%) was automatically calculated by taking the arithmetic average of reflectance (vertical axis, %) in the region of the obtained spectral reflectance curve corresponding to a wavelength (horizontal axis, nm) of 800 nm to 2400 nm.

<Particle Diameter>

A particle size distribution analyzer (produced by Shimadzu Corporation; product name: SALD-2300) was used to measure the particle diameter of each heat-shielding pigment (c) and other pigment (d) shown in Table 1 by determining the median diameter (D50) by laser diffraction/scattering.

<Surface Color Tone of Vinyl Chloride Resin Molded Product>
<<Initial>>

A chroma meter (produced by Konica Minolta, Inc.; product name: CR-400; C illuminant) was used to measure an L* value, an a* value, and a b* value in the L*a*b* color system defined by CIE with respect to 9 arbitrary locations on the surface of a vinyl chloride resin molded sheet in an initial (unheated post-molding) state.

Note that the L* value, a* value, and b* value were each taken to be an average value of values measured at the 9 locations.

<<Post-Heating (Heat Aging Test)>>

A laminate lined with a foamed polyurethane molded product was used as a sample. The sample was placed inside an oven and was heated in an environment having a temperature of 130° C. for 100 hours. Next, the foamed polyurethane molded product was peeled from the post-heating laminate to remove just a vinyl chloride resin molded sheet. An L* value, an a* value, and a b* value were measured with respect to the surface of the post-heating (heat aging test) vinyl chloride resin molded sheet under the same conditions as for the initial state.

<Low-Temperature Tensile Characteristics>

Low-temperature tensile characteristics of a vinyl chloride resin molded product were evaluated by measuring tensile elongation (%) and tensile fracture stress (MPa) for both an initial (unheated post-molding) state and a post-heating (heat aging test) state as described below.

<<Initial>>

An obtained vinyl chloride resin molded sheet was punched with a no. 1 dumbbell prescribed by JIS K6251, and then tensile elongation (%) and tensile fracture stress (MPa) at a low temperature of −35° C. were measured in accordance with JIS K7161 at a tensile rate of 200 mm/min. A larger value for tensile elongation indicates that the initial (unheated post-molding) vinyl chloride resin molded product has better low-temperature ductility.

<<Post-Heating (Heat Aging Test)>>

A laminate lined with a foamed polyurethane molded product was used as a sample. The sample was placed inside an oven and was heated in an environment having a temperature of 130° C. for 100 hours. Next, the foamed polyurethane molded product was peeled from the post-heating laminate to remove just a vinyl chloride resin molded sheet. The tensile elongation (%) and tensile fracture stress (MPa) of the post-heating vinyl chloride resin molded sheet were measured under the same conditions as for the initial state. A larger value for tensile elongation indicates that the post-heating (heat aging test) vinyl chloride resin molded product has better low-temperature ductility.

<Heat Shielding>

A laminate in which a surface skin formed by a vinyl chloride resin molded product was lined with a foamed polyurethane molded product was cut out with dimensions of 5 cm×5 cm to obtain a specimen. Next, the entire surface at the vinyl chloride resin molded sheet side of the specimen was irradiated with light from a halogen lamp under the conditions shown below so as to heat the surface of the specimen. After the irradiation time shown below had passed, a thermographic camera was used to measure the temperature (° C.) roughly centrally on the surface at the vinyl chloride resin molded sheet side of the specimen while the specimen was still being irradiated with light from the halogen lamp. A lower post-heating specimen surface temperature indicates that the vinyl chloride resin molded sheet has better heat shielding. Note that the emissivity of the vinyl chloride resin molded sheet is 0.92.

Effective wavelength of light from halogen lamp: 800 nm to 2400 nm

Distance between halogen lamp and specimen surface: 35 cm

Irradiation time of light from halogen lamp: 1 hr

Example 1

<Production of Vinyl Chloride Resin Composition>

With the exception of plasticizers (trimellitic acid ester and epoxidized soybean oil) and vinyl chloride resin fine particles used as a dusting agent, the ingredients indicated in Table 1 were supplied into and mixed in a Henschel mixer. The temperature of the mixture was raised to 80° C., at which point, all the plasticizers were added. The resultant mixture was then dried up by further raising the temperature thereof (i.e., the mixture changed to a dry state through absorption of the plasticizers by vinyl chloride resin particles used as a vinyl chloride resin). Thereafter, once the dried-up mixture had cooled to a temperature of 100° C. or lower, the vinyl chloride resin fine particles used as the dusting agent were added to the mixture to produce a vinyl chloride resin composition.

<Formation of Vinyl Chloride Resin Molded Product>

The vinyl chloride resin composition obtained as described above was sprinkled onto a textured mold that was heated to a temperature of 250° C. and, after being left to melt for a given time of about 8 seconds to 20 seconds, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet of 200 mm×300 mm×1 mm was removed from the mold as a vinyl chloride resin molded product.

The obtained vinyl chloride resin molded sheet was used to measure color tone in an initial (unheated post-molding) state and low-temperature tensile characteristics in an initial (unheated post-molding) state by the previously described methods. The results are shown in Table 1.

<Formation of Laminate>

The obtained vinyl chloride resin molded sheet was placed in a 200 mm×300 mm×10 mm mold with the textured surface underneath.

A polyol mixture was separately obtained by mixing 50 parts of a propylene oxide (PO)/ethylene oxide (EO) block adduct of propylene glycol (hydroxyl value 28, terminal EO unit content 10%, internal EO unit content 4%), 50 parts of a PO/EO block adduct of glycerin (hydroxyl value 21, terminal EO unit content 14%), 2.5 parts of water, 0.2 parts of an ethylene glycol solution of triethylenediamine (produced by Tosoh Corporation; product name: TEDA-L33), 1.2 parts of triethanolamine, 0.5 parts of triethylamine, and 0.5 parts of a foam stabilizer (produced by Shin-Etsu Chemical Co., Ltd.; product name: F-122). A mixed solution was then prepared by mixing the obtained polyol mixture with polymethylene polyphenylene polyisocyanate (polymeric MDI) in a ratio determined to give an index of 98. The prepared mixed solution was poured onto the vinyl chloride resin molded sheet that had been placed in the mold as described above. Thereafter, the mold was covered with a 348 mm×255 mm×10 mm aluminum plate to seal the mold. After sealing, the mold was left for 5 minutes such that a laminate was formed in the mold. The laminate included a vinyl chloride resin molded sheet (thickness: 1 mm) serving as a surface skin that was lined with a foamed polyurethane molded product (thickness: 9 mm; density: 0.18 g/cm$^3$).

The formed laminate was removed from the mold and the vinyl chloride resin sheet of the laminate was used to measure and evaluate post-heating color tone, post-heating low-temperature tensile characteristics, and heat shielding by the previously described methods. The results are shown in Table 1.

Example 2

A vinyl chloride resin composition, a vinyl chloride resin molded sheet, and a laminate were produced in the same way as in Example 1 with the exception that an Fe—Cr complex oxide A was used instead of the Mn—Bi complex oxide as a heat-shielding pigment (c) in production of the vinyl chloride resin composition.

Measurements and evaluations were performed by the same methods as in Example 1. The results are shown in Table 1.

Example 3

A vinyl chloride resin composition, a vinyl chloride resin molded sheet, and a laminate were produced in the same way as in Example 1 with the exception that an Fe—Cr complex oxide B was used instead of the Mn—Bi complex oxide as a heat-shielding pigment (c) in production of the vinyl chloride resin composition.

Measurements and evaluations were performed by the same methods as in Example 1. The results are shown in Table 1.

Comparative Example 1

A vinyl chloride resin composition, a vinyl chloride resin molded sheet, and a laminate were produced in the same way as in Example 1 with the exception that 3.7 parts of carbon black was further added as another pigment (d) and a heat-shielding pigment (c) was not used in production of the vinyl chloride resin composition.

Measurements and evaluations were performed by the same methods as in Example 1. The results are shown in Table 1.

TABLE 1

| | | | Example 1 | Example 2 | Example 3 | Comparative Example 1 |
|---|---|---|---|---|---|---|
| Vinyl chloride resin composition | Vinyl chloride resin (a) | Vinyl chloride resin particles[1] [parts by mass] | 100 | 100 | 100 | 100 |
| | | Vinyl chloride resin fine particles[2] [parts by mass] | 20 | 20 | 20 | 20 |
| | Plasticizer (b) | Trimellitic acid ester[3] [parts by mass] | 115 | 115 | 115 | 115 |
| | | Epoxidized soybean oil[4] [parts by mass] | 5 | 5 | 5 | 5 |
| | Heat-shielding pigment (c) | Mn—Bi complex oxide[5] [parts by mass] (L* value: 21.8, presence of reflectance of 20% or more at wavelength of 800 nm to 2400 nm: yes) | 7.40 | — | — | — |
| | | Fe—Cr complex oxide A[6] [parts by mass] (L* value: 22.7, presence of reflectance of 20% or more at wavelength of 800 nm to 2400 nm: yes) | — | 7.40 | — | — |
| | | Fe—Cr complex oxide B[7] [parts by mass] (L* value: 23.8, presence of reflectance of 20% or more at wavelength of 800 nm to 2400 nm: yes) | — | — | 7.40 | — |
| | Other pigments (d) | Carbon black[8] [parts by mass] (L* value: 20.5, presence of reflectance of 20% or more at wavelength of 800 nm to 2400 nm: no) | — | — | — | 3.70 |
| | | Phthalocyanine copper[9] [parts by mass] (L* value: 16.5, presence of reflectance of 20% or more at wavelength of 800 nm to 2400 nm: yes) | 0.62 | 0.62 | 0.62 | 0.62 |
| | | Pigment green 7[10] [parts by mass] (L* value: 17.1, presence of reflectance of 20% or more at wavelength of 800 nm to 2400 nm: yes) | 0.50 | 0.50 | 0.50 | 0.50 |
| | Additives | Stabilizers | | | | |
| | | Perchloric acid-treated hydrotalcite[11] [parts by mass] | 4.56 | 4.56 | 4.56 | 4.56 |
| | | Zeolite[12] [parts by mass] | 2.42 | 2.42 | 2.42 | 2.42 |
| | | β-Diketone[13] [parts by mass] | 0.49 | 0.49 | 0.49 | 0.49 |
| | | Fatty acid metal salt (zinc stearate)[14] [parts by mass] | 0.2 | 0.2 | 0.2 | 0.2 |
| | | Mold release agent: 12-Hydroxystearic acid[15] [parts by mass] | 0.4 | 0.4 | 0.4 | 0.4 |
| Evaluations | Surface color tone of vinyl chloride resin molded product | Initial L* value [—] | 23.5 | 23.4 | 24.0 | 22.8 |
| | | a* value [—] | −0.6 | −0.2 | −1.4 | −0.6 |
| | | b* value [—] | −0.4 | −0.4 | −0.9 | 0.1 |
| | | Post-heating L* value [—] | 24.8 | 24.6 | 25.2 | 23.8 |

TABLE 1-continued

|  |  |  | Example 1 | Example 2 | Example 3 | Comparative Example 1 |
|---|---|---|---|---|---|---|
|  | (130° C. × 100 hrs) | a* value [—] | −0.6 | −0.2 | −1.3 | −0.4 |
|  |  | b* value [—] | 0.1 | 0.0 | −0.4 | 0.2 |
| Low-temperature (−35° C.) tensile characteristics of vinyl chloride resin molded product | Initial | Tensile elongation [%] | 190 | 190 | 190 | 190 |
|  |  | Tensile fracture stress [MPa] | 24.0 | 23.0 | 24.0 | 24.0 |
|  | Post-heating (130° C. × 100 hrs) | Tensile elongation [%] | 140 | 140 | 140 | 130 |
|  |  | Tensile fracture stress [MPa] | 27.0 | 27.5 | 27.5 | 26.5 |
| Heat shielding of vinyl chloride resin molded product in laminate | Surface temperature after 1 hr irradiation with light from halogen lamp [° C] | | 65 | 66 | 69 | 73 |

(1) ZEST® (ZEST is a registered trademark in Japan, other countries, or both) 2000Z (product name) produced by Shin Dai-ichi Vinyl Corporation (produced by suspension polymerization; average degree of polymerization: 2,000; average particle diameter: 125 μm)

(2) ZEST PQLTX (product name) produced by Shin Dai-ichi Vinyl Corporation (produced by emulsion polymerization; average degree of polymerization: 800; average particle diameter: 1.8 μm)

(3) TRIMEX N-08 (product name) produced by Kao Corporation (4) ADK CIZER O-130S (product name) produced by ADEKA Corporation (5) Black 6301 (product name) produced by Asahi Kasei Kogyo Co., Ltd. (manganese-bismuth (Mn—Bi) complex oxide; color tone: L* value=21.8, a* value=1.2, b* value=1.0; average reflectance in wavelength region of 800 nm to 2400 nm: 50%)

(6) Black 6340 (product name) produced by Asahi Kasei Kogyo Co., Ltd. (iron-chromium (Fe—Cr) complex oxide; color tone: L* value=22.7, a* value=1.8, b* value=1.3; average reflectance in wavelength region of 800 nm to 2400 nm: 50%)

(7) Black 6350 (product name) produced by Asahi Kasei Kogyo Co., Ltd. (iron-chromium (Fe—Cr) complex oxide; color tone: L* value=23.8, a* value=1.5, b* value=3.7; average reflectance in wavelength region of 800 nm to 2400 nm: 50%)

(8) DA PX 1720(A) (product name) produced by Dainichiseika Color and Chemicals Mfg. Co., Ltd. (carbon black; color tone: L* value=20.5, a* value=1.0, b* value=2.7; average reflectance in wavelength region of 800 nm to 2400 nm: 2%)

(9) FASTOGEN Blue PA5380 (product name) produced by DIC Corporation (phthalocyanine copper; color tone: L* value=16.5, a* value=4.4, b* value=1.7; average reflectance in wavelength region of 800 nm to 2400 nm: 20%)

(10) FASTOGEN Green S (product name) produced by DIC Corporation (pigment green 7; color tone: L* value=17.1, a* value=1.3, b* value=0.7; average reflectance in wavelength region of 800 nm to 2400 nm: 20%)

(11) ALCAMIZER 5 (product name) produced by Kyowa Chemical Industry Co., Ltd.

(12) MIZUKALIZER DS (product name) produced by Mizusawa Industrial Chemicals, Ltd.

(13) Karenz DK-1 (product name) produced by Showa Denko K.K.

(14) SAKAI SZ2000 (product name) produced by Sakai Chemical Industry Co., Ltd.

(15) ADK STAB LS-12 (product name) produced by ADEKA Corporation

It can be seen from Table 1 that in Examples 1 to 3 in which a heat-shielding pigment (c) was used that had an L* value of not higher than a specific value and a reflectance of not less than a specific value, it was possible to form a vinyl chloride resin molded product having a desired dark color tone and excellent heat shielding compared to in Comparative Example 1 in which such a heat-shielding pigment (c) was not used.

INDUSTRIAL APPLICABILITY

According to the present disclosure, it is possible to provide a vinyl chloride resin composition that enables production of a vinyl chloride resin molded product having a desired dark color tone and excellent heat shielding.

Moreover, according to the present disclosure, it is possible to provide a vinyl chloride resin molded product and a laminate having a desired dark color tone and excellent heat shielding.

The invention claimed is:

1. A vinyl chloride resin composition comprising a vinyl chloride resin (a), a plasticizer (b), heat-shielding pigment (c), and an additional pigment (d),
    wherein the heat-shielding pigment (c) has an f-value of not lower than 18.0 and not higher than 60.0, and an a* value of −10 or greater in the L*a*b* color system and exhibits a spectral reflectance curve on which a wavelength where reflectance is 20% or more is present in a wavelength region of 800 nm to 2400 nm,
    content of the plasticizer (b) is 60 parts by mass or more and 200 parts by mass or less per 100 parts by mass of the vinyl chloride resin (a),
    content of the heat-shielding pigment (c) is 1 parts by mass or more and 10 parts by mass or less per 100 parts by mass of the vinyl chloride resin (a),
    the heat-shielding pigment (c) is a Mn—Bi complex oxide having a median diameter of 0.1 μm or more and 100 μm or less,
    the additional pigment (d) is selected from a group consisting of quinacridone-based pigments, perylene-based pigments, condensed polyazo pigments, isoindolinone-based pigments, phthalocyanine-based pigments, and a combination thereof,
    content of the additional pigment (d) is 30 parts by mass or less per 100 parts by mass of the heat-shielding pigment (c), and
    wherein the vinyl chloride resin composition further contains carbon black in an amount of greater than 0 and 0.1 parts by mass or less per 100 parts by mass of the heat-shielding pigment (c).

2. The vinyl chloride resin composition according to claim 1, wherein content of the heat-shielding pigment (c) is 5 parts by mass or more per 100 parts by mass of the vinyl chloride resin (a).

3. The vinyl chloride resin composition according to claim 1 used for powder molding.

4. The vinyl chloride resin composition according to claim 3 used for powder slush molding.

5. A vinyl chloride resin molded product obtained through molding of the vinyl chloride resin composition according to claim 1.

6. The vinyl chloride resin molded product according to claim 5, wherein a surface of the vinyl chloride resin molded product has an L* value of 23.0±2.5, an a* value of 0.5±1.0, and a b* value of 0.0±1.0 in the L*a*b* color system.

7. The vinyl chloride resin molded product according to claim 5 for a surface skin of an automobile interior component.

8. A laminate comprising:
   a foamed polyurethane molded product; and
   the vinyl chloride resin molded product according to claim 5.

9. The vinyl chloride resin composition according to claim 1, wherein the content of the Mn—Bi complex oxide is 5 parts by mass or more and 10 parts by mass or less per 100 parts by mass of the vinyl chloride resin (a).

10. The vinyl chloride resin composition according to claim 1, wherein an average reflectance of the heat-shielding pigment (c) in the wavelength region of 800 nm to 2400 nm on the spectral reflectance curve is 20% or more.

* * * * *

UNITED STATES PATENT AND TRADEMARK OFFICE
CERTIFICATE OF CORRECTION

PATENT NO. : 11,208,549 B2
APPLICATION NO. : 16/481597
DATED : December 28, 2021
INVENTOR(S) : Shota Nishimura It is certified that error appears in the above-identified patent and that said Letters Patent is hereby corrected as shown below:

In the Claims

Claim 1, Column 20, Line 2-3, please delete "heat-shielding pigment (c)" and insert --a heat-shielding pigment (c)--.

Claim 1, Column 20, Line 4, please delete "f-value" and insert --L* value--.

Claim 1, Column 20, Line 6, please delete "value of -10" and insert --value of -1.0--.

Signed and Sealed this
Sixth Day of August, 2024

Katherine Kelly Vidal
*Director of the United States Patent and Trademark Office*